United States Patent
Olshansky (10) Patent No.: US 10,728,443 B1
(45) Date of Patent: Jul. 28, 2020

(54) AUTOMATIC CAMERA ANGLE SWITCHING TO CREATE COMBINED AUDIOVISUAL FILE

(71) Applicant: On Time Staffing Inc., Golden Valley, MN (US)

(72) Inventor: Roman Olshansky, Plymouth, MN (US)

(73) Assignee: On Time Staffing Inc., Golden Valley, MN (US)

( * ) Notice: Subject to any disclaimer, the term of this patent is extended or adjusted under 35 U.S.C. 154(b) by 0 days.

(21) Appl. No.: 16/366,746

(22) Filed: Mar. 27, 2019

(51) Int. Cl.
| H04N 5/232 | (2006.01) |
| H04N 7/18 | (2006.01) |
| G06F 16/432 | (2019.01) |
| G06F 16/483 | (2019.01) |
| G06Q 10/10 | (2012.01) |

(52) U.S. Cl.
CPC ....... *H04N 5/23219* (2013.01); *G06F 16/433* (2019.01); *G06F 16/483* (2019.01); *G06Q 10/1053* (2013.01); *H04N 7/181* (2013.01)

(58) Field of Classification Search
CPC .. H04N 5/23219; H04N 7/181; G06F 16/483; G06Q 10/1053
See application file for complete search history.

(56) References Cited

U.S. PATENT DOCUMENTS

| 3,764,135 A | 10/1973 | Madison |
| 5,109,281 A | 4/1992 | Kobori et al. |
| 5,410,344 A | 4/1995 | Graves et al. |
| 5,867,209 A | 2/1999 | Irie et al. |
| 5,884,004 A | 3/1999 | Sato et al. |
| 5,886,967 A | 3/1999 | Aramaki |
| 5,906,372 A | 5/1999 | Recard, Jr. |
| 5,949,792 A | 9/1999 | Yasuda et al. |

(Continued)

FOREIGN PATENT DOCUMENTS

| AU | 2002310201 | 3/2003 |
| CA | 2206105 | 12/2000 |

(Continued)

OTHER PUBLICATIONS

"Final Office Action," for U.S. Appl. No. 16/366,703 dated Nov. 19, 2019 (25 pages).

(Continued)

*Primary Examiner* — Twyler L Haskins
*Assistant Examiner* — Akshay Trehan
(74) *Attorney, Agent, or Firm* — Pauly, DeVries Smith & Deffner LLC (57) ABSTRACT

A system and method are provided for automatically concatenating two or more audiovisual clips containing video input from multiple cameras, and producing a combined audiovisual file containing video that switches between the two video inputs. In some examples, two video inputs and an audio input are recorded synchronously and are synchronized. The audio input can be sampled to locate low-noise audio events. The audiovisual file contains video that switches between two or more camera angles at the low-noise audio events. In one aspect, pauses are automatically removed from the audiovisual files. In another aspect, the system detects switch-initiating events, and switches between camera angles in response to detecting a switch-initiating event.

20 Claims, 7 Drawing Sheets

(56) References Cited

U.S. PATENT DOCUMENTS

| | | |
|---|---|---|
| 6,289,165 B1 | 9/2001 | Abecassis |
| 6,504,990 B1 | 1/2003 | Abecassis |
| 6,618,723 B1 | 9/2003 | Smith |
| 6,981,000 B2 | 12/2005 | Park et al. |
| 7,095,329 B2 | 8/2006 | Saubolle |
| 7,146,627 B1 | 12/2006 | Ismail et al. |
| 7,293,275 B1 | 11/2007 | Krieger et al. |
| 7,336,890 B2 | 2/2008 | Lu et al. |
| 7,606,444 B1 | 10/2009 | Erol et al. |
| 7,702,542 B2 | 4/2010 | Aslanian, Jr. |
| 7,725,812 B1 | 5/2010 | Balkus et al. |
| 7,797,402 B2 | 9/2010 | Roos |
| 7,810,117 B2 | 10/2010 | Karnalkar et al. |
| 7,904,490 B2 | 3/2011 | Ogikubo |
| 7,974,443 B2 | 7/2011 | Kipman et al. |
| 7,991,635 B2 | 8/2011 | Hartmann |
| 8,046,814 B1 | 10/2011 | Badenell |
| 8,111,326 B1 | 2/2012 | Talwar |
| 8,169,548 B2 | 5/2012 | Ryckman |
| 8,185,543 B1 | 5/2012 | Choudhry et al. |
| 8,241,628 B2 | 8/2012 | Diefenbach-streiber et al. |
| 8,266,068 B1 | 9/2012 | Foss et al. |
| 8,300,785 B2 | 10/2012 | White |
| 8,301,790 B2 | 10/2012 | Morrison et al. |
| 8,326,133 B2 | 12/2012 | Lemmers |
| 8,331,457 B2 | 12/2012 | Mizuno et al. |
| 8,331,760 B2 | 12/2012 | Butcher |
| 8,339,500 B2 | 12/2012 | Hattori et al. |
| 8,387,094 B1 | 2/2013 | Ho et al. |
| 8,505,054 B1 | 8/2013 | Kirley |
| 8,508,572 B1 | 8/2013 | Ryckman et al. |
| 8,566,880 B2 | 10/2013 | Dunker et al. |
| 8,600,211 B2 | 12/2013 | Nagano et al. |
| 8,611,422 B1 | 12/2013 | Yagnik et al. |
| 8,633,964 B1 | 1/2014 | Zhu |
| 8,751,231 B1 | 6/2014 | Larsen et al. |
| 8,774,604 B2 | 7/2014 | Torii et al. |
| 8,792,780 B2 | 7/2014 | Hattori |
| 8,824,863 B2 | 9/2014 | Kitamura et al. |
| 8,854,457 B2 | 10/2014 | De Vleeschouwer et al. |
| 8,856,000 B1 | 10/2014 | Larsen et al. |
| 8,902,282 B1 | 12/2014 | Zhu |
| 8,913,103 B1 * | 12/2014 | Sargin ............... G06K 9/00221 348/14.12 |
| 8,918,532 B2 | 12/2014 | Lueth et al. |
| 8,988,528 B2 | 3/2015 | Hikita |
| 9,009,045 B1 | 4/2015 | Larsen et al. |
| 9,015,746 B2 | 4/2015 | Holmdahl et al. |
| 9,106,804 B2 | 8/2015 | Roberts et al. |
| 9,111,579 B2 | 8/2015 | Meaney et al. |
| 9,117,201 B2 | 8/2015 | Kennell et al. |
| 9,129,640 B2 | 9/2015 | Hamer |
| 9,135,674 B1 | 9/2015 | Yagnik et al. |
| 9,223,781 B2 | 12/2015 | Pearson et al. |
| 9,224,156 B2 | 12/2015 | Moorer |
| 9,305,286 B2 | 4/2016 | Larsen et al. |
| 9,378,486 B2 | 6/2016 | Taylor et al. |
| 9,398,315 B2 | 7/2016 | Oks et al. |
| 9,402,050 B1 | 7/2016 | Recchia et al. |
| 9,437,247 B2 | 9/2016 | Pendergast et al. |
| 9,438,934 B1 | 9/2016 | Zhu |
| 9,443,556 B2 | 9/2016 | Cordell et al. |
| 9,456,174 B2 | 9/2016 | Boyle et al. |
| 9,462,301 B2 | 10/2016 | Paśko |
| 9,554,160 B2 | 1/2017 | Han et al. |
| 9,583,144 B2 | 2/2017 | Ricciardi |
| 9,600,723 B1 * | 3/2017 | Pantofaru ............... H04N 7/181 |
| 9,607,655 B2 | 3/2017 | Bloch et al. |
| 9,653,115 B2 | 5/2017 | Bloch et al. |
| 9,666,194 B2 | 5/2017 | Ondeck et al. |
| 9,684,435 B2 | 6/2017 | Carr et al. |
| 9,693,019 B1 | 6/2017 | Fluhr et al. |
| 9,710,790 B2 | 7/2017 | Taylor et al. |
| 9,723,223 B1 | 8/2017 | Banta et al. |
| 9,792,955 B2 | 10/2017 | Fleischhauer et al. |
| 9,805,767 B1 | 10/2017 | Strickland |
| 9,823,809 B2 | 11/2017 | Roos |
| 9,876,963 B2 | 1/2018 | Nakamura et al. |
| 9,881,647 B2 | 1/2018 | Mccauley et al. |
| 9,936,185 B2 | 4/2018 | Delvaux et al. |
| 9,940,973 B2 | 4/2018 | Roberts et al. |
| 9,979,921 B2 | 5/2018 | Holmes |
| 10,008,239 B2 | 6/2018 | Eris |
| 10,115,038 B2 | 10/2018 | Hazur et al. |
| 10,147,460 B2 | 12/2018 | Ullrich |
| 10,152,696 B2 | 12/2018 | Thankappan et al. |
| 10,168,866 B2 | 1/2019 | Wakeen et al. |
| 10,178,427 B2 | 1/2019 | Huang |
| 10,242,345 B2 | 3/2019 | Taylor et al. |
| 10,268,736 B1 | 4/2019 | Balasia et al. |
| 10,296,873 B1 | 5/2019 | Balasia et al. |
| 10,318,927 B2 | 6/2019 | Champaneria |
| 10,325,243 B1 | 6/2019 | Ross et al. |
| 10,346,805 B2 | 7/2019 | Taylor et al. |
| 10,346,928 B2 | 7/2019 | Li et al. |
| 10,438,135 B2 | 10/2019 | Larsen et al. |
| 2001/0001160 A1 | 5/2001 | Shoff et al. |
| 2001/0038746 A1 | 11/2001 | Hughes et al. |
| 2002/0097984 A1 | 7/2002 | Abecassis |
| 2002/0122659 A1 | 9/2002 | Mcgrath et al. |
| 2003/0005429 A1 | 1/2003 | Colsey |
| 2003/0027611 A1 | 2/2003 | Recard |
| 2003/0189589 A1 | 10/2003 | Leblanc et al. |
| 2003/0194211 A1 | 10/2003 | Abecassis |
| 2004/0033061 A1 | 2/2004 | Hughes et al. |
| 2004/0186743 A1 | 9/2004 | Cordero |
| 2004/0264919 A1 | 12/2004 | Taylor et al. |
| 2005/0232462 A1 | 10/2005 | Vallone et al. |
| 2005/0235033 A1 | 10/2005 | Doherty |
| 2005/0271251 A1 | 12/2005 | Russell et al. |
| 2006/0042483 A1 | 3/2006 | Work et al. |
| 2006/0100919 A1 | 5/2006 | Levine |
| 2007/0088601 A1 | 4/2007 | Money et al. |
| 2007/0124161 A1 | 5/2007 | Mueller et al. |
| 2007/0237502 A1 | 10/2007 | Ryckman et al. |
| 2007/0288245 A1 | 12/2007 | Benjamin |
| 2009/0083103 A1 | 3/2009 | Basser |
| 2009/0083670 A1 | 3/2009 | Roos |
| 2009/0087161 A1 | 4/2009 | Roberts et al. |
| 2009/0144785 A1 | 6/2009 | Walker et al. |
| 2009/0171899 A1 | 7/2009 | Chittoor et al. |
| 2009/0258334 A1 | 10/2009 | Pyne |
| 2010/0086283 A1 | 4/2010 | Ramachandran et al. |
| 2010/0183280 A1 * | 7/2010 | Beauregard .......... G11B 27/034 386/285 |
| 2010/0191561 A1 | 7/2010 | Jeng et al. |
| 2010/0199228 A1 | 8/2010 | Latta et al. |
| 2010/0223109 A1 | 9/2010 | Hawn et al. |
| 2010/0325307 A1 | 12/2010 | Roos |
| 2011/0055930 A1 | 3/2011 | Flake et al. |
| 2011/0060671 A1 | 3/2011 | Erbey et al. |
| 2011/0076656 A1 | 3/2011 | Scott et al. |
| 2011/0088081 A1 | 4/2011 | Folkesson et al. |
| 2012/0036127 A1 | 2/2012 | Work et al. |
| 2012/0084649 A1 | 4/2012 | Dowdell et al. |
| 2012/0114246 A1 | 5/2012 | Weitzman |
| 2012/0130771 A1 | 5/2012 | Kannan et al. |
| 2012/0257875 A1 * | 10/2012 | Sharpe ................ G11B 27/034 386/278 |
| 2012/0271774 A1 | 10/2012 | Clegg |
| 2013/0007670 A1 | 1/2013 | Roos |
| 2013/0016815 A1 | 1/2013 | Odinak et al. |
| 2013/0016816 A1 | 1/2013 | Odinak et al. |
| 2013/0016823 A1 | 1/2013 | Odinak et al. |
| 2013/0024105 A1 | 1/2013 | Thomas |
| 2013/0111401 A1 | 5/2013 | Newman et al. |
| 2013/0121668 A1 | 5/2013 | Meaney et al. |
| 2013/0124998 A1 | 5/2013 | Pendergast et al. |
| 2013/0124999 A1 | 5/2013 | Agnoli et al. |
| 2013/0125000 A1 | 5/2013 | Fleischhauer et al. |
| 2013/0212033 A1 | 8/2013 | Work et al. |
| 2013/0212180 A1 | 8/2013 | Work et al. |
| 2013/0216206 A1 * | 8/2013 | Dubin .................... H04N 9/87 386/282 |

(56) References Cited

U.S. PATENT DOCUMENTS

| | | |
|---|---|---|
| 2013/0218688 A1 | 8/2013 | Roos |
| 2013/0222601 A1 | 8/2013 | Engstroem et al. |
| 2013/0226674 A1 | 8/2013 | Field et al. |
| 2013/0226910 A1 | 8/2013 | Work et al. |
| 2013/0254192 A1 | 9/2013 | Work et al. |
| 2013/0259447 A1 | 10/2013 | Sathish et al. |
| 2013/0266925 A1 | 10/2013 | Nunamaker, Jr. et al. |
| 2013/0268452 A1 | 10/2013 | Macewen et al. |
| 2013/0283378 A1 | 10/2013 | Costigan et al. |
| 2013/0290210 A1 | 10/2013 | Cline et al. |
| 2013/0290325 A1 | 10/2013 | Work et al. |
| 2013/0290420 A1 | 10/2013 | Work et al. |
| 2013/0290448 A1 | 10/2013 | Work et al. |
| 2013/0297589 A1 | 11/2013 | Work et al. |
| 2014/0092254 A1 | 4/2014 | Mughal et al. |
| 2014/0123177 A1 | 5/2014 | Kim et al. |
| 2014/0125703 A1 | 5/2014 | Roveta et al. |
| 2014/0153902 A1 | 6/2014 | Pearson et al. |
| 2014/0186004 A1 | 7/2014 | Hamer |
| 2014/0192200 A1 | 7/2014 | Zagron |
| 2014/0198196 A1 | 7/2014 | Howard et al. |
| 2014/0214709 A1 | 7/2014 | Greaney |
| 2014/0245146 A1 | 8/2014 | Roos |
| 2014/0258288 A1 | 9/2014 | Work et al. |
| 2014/0270706 A1 | 9/2014 | Pasko |
| 2014/0278683 A1 | 9/2014 | Kennell et al. |
| 2014/0282709 A1 | 9/2014 | Hardy et al. |
| 2014/0317126 A1 | 10/2014 | Work et al. |
| 2014/0325359 A1 | 10/2014 | Vehovsky et al. |
| 2014/0327779 A1 | 11/2014 | Eronen et al. |
| 2014/0330734 A1 | 11/2014 | Sung et al. |
| 2014/0336942 A1 | 11/2014 | Pe'er et al. |
| 2014/0337900 A1 | 11/2014 | Hurley |
| 2014/0356822 A1 | 12/2014 | Hoque et al. |
| 2015/0003603 A1 | 1/2015 | Odinak et al. |
| 2015/0003605 A1 | 1/2015 | Odinak et al. |
| 2015/0006422 A1 | 1/2015 | Carter et al. |
| 2015/0012453 A1 | 1/2015 | Odinak et al. |
| 2015/0046357 A1 | 2/2015 | Danson et al. |
| 2015/0063775 A1 | 3/2015 | Nakamura et al. |
| 2015/0067723 A1 | 3/2015 | Bloch et al. |
| 2015/0100702 A1 | 4/2015 | Krishna et al. |
| 2015/0127565 A1 | 5/2015 | Chevalier et al. |
| 2015/0139601 A1 | 5/2015 | Mate et al. |
| 2015/0154564 A1 | 6/2015 | Moon et al. |
| 2015/0155001 A1 | 6/2015 | Kikugawa et al. |
| 2015/0170303 A1 | 6/2015 | Geritz et al. |
| 2015/0201134 A1 | 7/2015 | Carr et al. |
| 2015/0205800 A1 | 7/2015 | Work et al. |
| 2015/0205872 A1 | 7/2015 | Work et al. |
| 2015/0206102 A1 | 7/2015 | Cama et al. |
| 2015/0222815 A1 | 8/2015 | Wang et al. |
| 2015/0228306 A1 | 8/2015 | Roberts et al. |
| 2015/0269165 A1 | 9/2015 | Work et al. |
| 2015/0269530 A1 | 9/2015 | Work et al. |
| 2015/0271289 A1 | 9/2015 | Work et al. |
| 2015/0278223 A1 | 10/2015 | Work et al. |
| 2015/0278290 A1 | 10/2015 | Work et al. |
| 2015/0278964 A1 | 10/2015 | Work et al. |
| 2015/0324698 A1 | 11/2015 | Karaoguz et al. |
| 2015/0339939 A1 | 11/2015 | Gustafson et al. |
| 2015/0356512 A1 * | 12/2015 | Bradley ............... G06F 16/735 705/321 |
| 2015/0380052 A1 | 12/2015 | Hamer |
| 2016/0005029 A1 | 1/2016 | Ivey et al. |
| 2016/0036976 A1 | 2/2016 | Odinak et al. |
| 2016/0104096 A1 | 4/2016 | Ovick et al. |
| 2016/0116827 A1 | 4/2016 | Tarres Bolos |
| 2016/0154883 A1 | 6/2016 | Boerner |
| 2016/0155475 A1 | 6/2016 | Hamer |
| 2016/0180883 A1 | 6/2016 | Hamer |
| 2016/0219264 A1 | 7/2016 | Delvaux et al. |
| 2016/0225409 A1 | 8/2016 | Eris |
| 2016/0225410 A1 | 8/2016 | Lee et al. |
| 2016/0247537 A1 | 8/2016 | Ricciardi |
| 2016/0313892 A1 | 10/2016 | Roos |
| 2016/0323608 A1 | 11/2016 | Bloch et al. |
| 2016/0330398 A1 | 11/2016 | Recchia et al. |
| 2017/0026667 A1 | 1/2017 | Pasko |
| 2017/0039525 A1 | 2/2017 | Seidle et al. |
| 2017/0076751 A9 | 3/2017 | Hamer |
| 2017/0134776 A1 | 5/2017 | Ranjeet et al. |
| 2017/0164015 A1 | 6/2017 | Abramov et al. |
| 2017/0171602 A1 | 6/2017 | Qu |
| 2017/0178688 A1 | 6/2017 | Ricciardi |
| 2017/0195491 A1 | 7/2017 | Odinak et al. |
| 2017/0206504 A1 | 7/2017 | Taylor et al. |
| 2017/0213190 A1 | 7/2017 | Hazan |
| 2017/0213573 A1 | 7/2017 | Takeshita et al. |
| 2017/0236073 A1 | 8/2017 | Borisyuk et al. |
| 2017/0244894 A1 | 8/2017 | Aggarwal et al. |
| 2017/0244984 A1 | 8/2017 | Aggarwal et al. |
| 2017/0244991 A1 | 8/2017 | Aggarwal et al. |
| 2017/0262706 A1 | 9/2017 | Sun et al. |
| 2017/0264958 A1 | 9/2017 | Hutten |
| 2017/0293413 A1 | 10/2017 | Matsushita et al. |
| 2017/0316806 A1 | 11/2017 | Warren et al. |
| 2017/0353769 A1 | 12/2017 | Husain et al. |
| 2017/0372748 A1 | 12/2017 | Mccauley et al. |
| 2018/0011621 A1 | 1/2018 | Roos |
| 2018/0025303 A1 | 1/2018 | Janz |
| 2018/0054641 A1 | 2/2018 | Hall et al. |
| 2018/0070045 A1 | 3/2018 | Holmes |
| 2018/0074681 A1 | 3/2018 | Roos |
| 2018/0082238 A1 | 3/2018 | Shani |
| 2018/0096307 A1 | 4/2018 | Fortier et al. |
| 2018/0109737 A1 | 4/2018 | Nakamura et al. |
| 2018/0109826 A1 | 4/2018 | Mccoy et al. |
| 2018/0114154 A1 | 4/2018 | Bae |
| 2018/0130497 A1 | 5/2018 | Mccauley et al. |
| 2018/0132014 A1 | 5/2018 | Khazanov et al. |
| 2018/0150604 A1 | 5/2018 | Arena et al. |
| 2018/0158027 A1 | 6/2018 | Venigalla |
| 2018/0182436 A1 | 6/2018 | Ullrich |
| 2018/0191955 A1 | 7/2018 | Aoki et al. |
| 2018/0218238 A1 | 8/2018 | Viirre et al. |
| 2018/0226102 A1 | 8/2018 | Roberts et al. |
| 2018/0227501 A1 | 8/2018 | King |
| 2018/0253697 A1 | 9/2018 | Sung et al. |
| 2018/0268868 A1 | 9/2018 | Salokannel et al. |
| 2018/0270613 A1 | 9/2018 | Park |
| 2018/0302680 A1 | 10/2018 | Cormican |
| 2018/0308521 A1 | 10/2018 | Iwamoto |
| 2018/0316947 A1 | 11/2018 | Todd |
| 2018/0336930 A1 | 11/2018 | Takahashi |
| 2018/0350405 A1 * | 12/2018 | Marco ............... H04N 5/77 |
| 2019/0057356 A1 | 2/2019 | Larsen et al. |
| 2019/0087558 A1 | 3/2019 | Mercury et al. |
| 2019/0096307 A1 | 3/2019 | Liang et al. |
| 2019/0259002 A1 | 8/2019 | Balasia et al. |
| 2020/0126545 A1 | 4/2020 | Kakkar et al. |

FOREIGN PATENT DOCUMENTS

| | | |
|---|---|---|
| CA | 2763634 | 12/2012 |
| CN | 109146430 | 1/2019 |
| EP | 1775949 | 12/2007 |
| JP | 2009258175 | 11/2009 |
| JP | 2019016192 | 1/2019 |
| WO | 9703366 | 1/1997 |
| WO | 9713367 | 4/1997 |
| WO | 9905865 | 2/1999 |
| WO | 0133421 | 5/2001 |
| WO | 0117250 | 9/2002 |
| WO | 03003725 | 1/2003 |
| WO | 2004062563 | 7/2004 |
| WO | 2005114377 | 12/2005 |
| WO | 2006129496 | 12/2006 |
| WO | 2007097218 | 8/2007 |
| WO | 2008029803 | 3/2008 |
| WO | 2008039407 | 4/2008 |
| WO | 2009042858 | 4/2009 |
| WO | 2009042900 | 4/2009 |
| WO | 2009075190 | 6/2009 |

(56) References Cited

FOREIGN PATENT DOCUMENTS

| | | |
|---|---|---|
| WO | 2009116955 | 9/2009 |
| WO | 2009157446 | 12/2009 |
| WO | 2010055624 | 5/2010 |
| WO | 2010116998 | 10/2010 |
| WO | 2011007011 | 1/2011 |
| WO | 2011035419 | 3/2011 |
| WO | 2011129578 | 10/2011 |
| WO | 2011136571 | 11/2011 |
| WO | 2012039959 | 6/2012 |
| WO | 2012089855 | 7/2012 |
| WO | 2013026095 | 2/2013 |
| WO | 2013039351 | 3/2013 |
| WO | 2013074207 | 5/2013 |
| WO | 2013088208 | 6/2013 |
| WO | 2013093176 | 6/2013 |
| WO | 2013131134 | 9/2013 |
| WO | 2014089362 | 6/2014 |
| WO | 2014093668 | 6/2014 |
| WO | 2014152021 | 9/2014 |
| WO | 2014163283 | 10/2014 |
| WO | 2014164549 | 10/2014 |
| WO | 2015031946 | 4/2015 |
| WO | 2015071490 | 5/2015 |
| WO | 2016031431 | 3/2016 |
| WO | 2016053522 | 4/2016 |
| WO | 2016073206 | 5/2016 |
| WO | 2016123057 | 8/2016 |
| WO | 2016138121 | 9/2016 |
| WO | 2016138161 | 9/2016 |
| WO | 2016189348 | 12/2016 |
| WO | 2017022641 | 2/2017 |
| WO | 2017042831 | 3/2017 |
| WO | 2017049612 | 3/2017 |
| WO | 2017051063 | 3/2017 |
| WO | 2017130810 | 8/2017 |
| WO | 2017150772 | 9/2017 |
| WO | 2017192125 | 11/2017 |
| WO | 2018042175 | 3/2018 |
| WO | 2018094443 | 5/2018 |

OTHER PUBLICATIONS

"Non-Final Office Action," for U.S. Appl. No. 16/366,703 dated Jun. 10, 2019 (28 pages).
"International Search Report and Written Opinion," for PCT Application No. PCT/US2020/024488 dated May 19, 2020 (14 pages).
"Non-Final Office Action," for U.S. Appl. No. 16/366,703 dated May 6, 2020 (65 pages).
"Non-Final Office Action," for U.S. Appl. No. 16/696,781 dated Apr. 7, 2020 (43 pages).

* cited by examiner

AUTOMATIC CAMERA ANGLE SWITCHING TO CREATE COMBINED AUDIOVISUAL FILE

BACKGROUND

Video interviews can be taped and used by recruiters to assist in representing candidates to potential employers. These videos can sometimes be one-dimensional and uninteresting. Videos that cut between multiple views of the candidate can be more visually interesting, but editing and producing high-quality video is tedious and time-consuming.

SUMMARY

A system and method for automatically producing audiovisual files containing video from multiple cameras is provided. In some examples, a system is provided having a first video input and a second video input; an audio input; a time counter providing a timeline associated with the first video input, the second video input, and the audio input, the timeline enables a time synchronization of the first video input, the second video input, and the audio input; a non-transitory computer memory and a computer processor; and computer instructions stored on the memory for instructing the processor to perform the steps of: sampling the audio input to identify a low noise audio segment in which the decibel level is below a threshold level for a predetermined period of time; and automatically assembling a combined audiovisual file by performing the steps of: retaining a first audiovisual clip can include a portion of the audio input and first video input occurring before the low noise audio segment, retaining a second audiovisual clip can include a portion of the audio input and second video input occurring after the low noise audio segment, and concatenating the first audiovisual clip and the second audiovisual clip to create a combined audiovisual file. In some examples, the first video input, the second video input, and the audio input are recorded synchronously, and the combined audiovisual file is a video interview of a job candidate.

In some examples, the first audiovisual clip ends at the low noise audio segment and the second audiovisual clip begins at the low noise audio segment. In some examples, the first audiovisual clip is earlier in the timeline than the second audiovisual clip, and the first audiovisual clip corresponds to a time immediately preceding the second audiovisual clip. In some examples, the predetermined period of time is at least two seconds. Some examples can further include computer instructions stored on the memory for instructing the processor to perform the steps of: sampling the audio input to identify a beginning of the low noise audio segment and an end of the low noise audio segment; removing portions of the audio input, the first video input, and the second video input that fall between the beginning and end of the low noise audio segment; and concatenating the first audiovisual clip and the second audiovisual clip to create a combined audiovisual file that does not contain the low noise audio segment; the first audiovisual clip includes a portion of the audio input and first video input occurring before the beginning of the low noise audio segment, and the second audiovisual clip includes a portion of the audio input and the second video input occurring after the end of the low noise audio segment.

In some examples, the low noise audio segment is at least four seconds long. Some examples further include computer instructions stored on the memory for instructing the processor to perform the steps of: sampling the audio input to identify multiple low noise audio segments in which the decibel level is below the threshold level for a predetermined period of time; and automatically concatenating alternating audiovisual clips that switch between the first video input and second video input after each low noise audio segment. Some examples further include computer instructions stored on the memory for instructing the processor to perform the steps of: sampling the audio input to identify multiple low noise audio segments in which the decibel level is below the threshold level for at least the predetermined period of time; extracting content data from the first video input, the second video input, or the audio input to identify one or more switch-initiating events; automatically assembling a combined audiovisual file that switches between the first video input and the second video input following a switch-initiating event. In some examples, the switch-initiating events include one or more of: a gesture recognition event; a facial recognition event; a length of time of at least 30 seconds since a most recent camera angle switch; or a keyword extracted from the audio input via speech-to-text. In some examples, a computer-implemented method includes receiving first video input of an individual from a first camera, receiving second video input of the individual from a second camera, receiving audio input of the individual from a microphone, the first video input, the second video input, and the audio input are recorded synchronously; sampling the audio input, the first video input, or the second video input to identify an event; automatically assembling a combined audiovisual file by performing the steps of: retaining a first audiovisual clip can include a portion of the first video input occurring before the event; retaining a second audiovisual clip can include a portion of the second video input occurring after the event; and concatenating the first audiovisual clip and the second audiovisual clip to create a combined audiovisual file containing video of the individual from two camera angles.

In some examples, the combined audiovisual file is a video interview of a job candidate. In some examples, the event is a low noise audio segment. Some examples further include the steps of: sampling the audio input to identify a plurality of low noise audio segments; retaining video clips that alternately switch between the first video input and the second video input following the low noise audio segments; and concatenating the alternating video clips to create a combined audiovisual file containing video that alternates between two camera angles. Some examples further include the step of extracting content data from the first video input, the second video input, or the audio input to identify one or more switch-initiating events, switching between the first video input and the second video input is only performed for low noise audio segments that follow switch-initiating events.

In some examples, the content data is at least one of: facial recognition; gesture recognition; posture recognition; or keywords extracted using speech-to-text. Some examples further include the steps of: sampling the audio input to identify multiple extended low noise audio segments that are at least four seconds long; removing the portions of the audio input, the first video input, and the second video input that fall between the beginning and end of the extended low noise audio segments; concatenating video clips containing alternating portions of the first video input and portions of the second video input to create a combined audiovisual file that does not contain audio or video occurring between the beginning and end of extended low noise audio segments.

In some examples, a system is included having a first video input and a second video input; an audio input; a time counter providing a timeline associated with the first video input, the second video input, and the audio input, the timeline enables a time synchronization of the first video input, the second video input, and the audio input; a non-transitory computer memory and a computer processor; and computer instructions stored on the memory for instructing the processor to perform the steps of: sampling the audio input to identify a low noise audio segment in which the decibel level is below a threshold level for a predetermined period of time; and automatically assembling a combined audiovisual file by performing the steps of: retaining a first audiovisual clip can include a portion of the first video input and synchronized audio input occurring before the low noise audio segment; retaining a second audiovisual clip can include a portion of the second video input and synchronized audio input occurring after the low noise audio segment; and concatenating the first audiovisual clip and the second audiovisual clip to create a combined audiovisual file.

In some examples, the first video input, the second video input, and the audio input are recorded synchronously, and the combined audiovisual file is a video interview of a job candidate. Some examples further include computer instructions stored on the memory for instructing the processor to perform the steps of: sampling the audio input to identify a plurality of low noise audio segments in which the decibel level is below the threshold level for the predetermined period of time; and concatenating a plurality of audiovisual clips that switch between the first video input and the second video input after each low noise audio segment to create a combined audiovisual file containing video that alternates between two camera angles.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense.

DETAILED DESCRIPTION

The present disclosure relates to a system and method for producing audiovisual files containing video that automatically cuts between video footage from multiple cameras. The multiple cameras can be arranged during recording such that they each focus on a subject from a different camera angle, providing multiple viewpoints of the subject. The system can be used for recording a person who is speaking, such as in a video interview. Although the system will be described in the context of a video interview, other uses are contemplated and are within the scope of the technology. For example, the system could be used to record educational videos, entertaining or informative speaking, or other situations in which an individual is being recorded with video and audio.

Some implementations of the technology provide a kiosk or booth that houses multiple cameras and a microphone. The cameras each produce a video input to the system, and the microphone produces an audio input. A time counter provides a timeline associated with the multiple video inputs and the audio input. The timeline enables video input from each camera to be time-synchronized with the audio input from the microphone.

Multiple audiovisual clips are created by combining video inputs with a corresponding synchronized audio input. The system detects events in the audio input, video inputs, or both the audio and video inputs, such as a pause in speaking corresponding to low-audio input. The events correspond to a particular time in the synchronization timeline. To automatically assemble audiovisual files, the system concatenates a first audiovisual clip and a second audiovisual clip. The first audiovisual clip contains video input before the event, and the second audiovisual clip contains video input after the event. The system can further create audiovisual files that concatenate three or more audiovisual clips that switch between particular video inputs after predetermined events.

One example of an event that can be used as a marker for deciding when to cut between different video clips is a drop in the audio volume detected by the microphone. During recording, the speaker may stop speaking briefly, such as when switching between topics, or when pausing to collect their thoughts. These pauses can correspond to a significant drop in audio volume. In some examples, the system looks for these low-noise events in the audio track. Then, when assembling an audiovisual file of the video interview, the system can change between different cameras at the pauses. This allows the system to automatically produce high quality, entertaining, and visually interesting videos with no need for a human editor to edit the video interview. Because the quality of the viewing experience is improved, the viewer is likely to have a better impression of a candidate or other speaker in the video. A higher quality video better showcases the strengths of the speaker, providing benefits to the speaker as well as the viewer.

In another aspect, the system can remove unwanted portions of the video automatically based on the contents of the audio or video inputs, or both. For example, the system may discard portions of the video interview in which the individual is not speaking for an extended period of time. One way this can be done is by keeping track of the length of time that the audio volume is below a certain volume. If the audio volume is low for an extended period of time, such as a predetermined number of seconds, the system can note the time that the low noise segment begins and ends. A first audiovisual clip that ends at the beginning of the low noise segment can be concatenated with a second audiovisual clip that begins at the end of the low noise segment. The audio input and video inputs that occur between the beginning and end of the low noise segment can be discarded. In some examples, the system can cut multiple pauses from the video interview, and switch between camera angles multiple times. This eliminates dead air and improves the quality of the video interview for a viewer.

In another aspect, the system can choose which video input to use in the combined audiovisual file based on the content of the video input. For example, the video inputs from the multiple cameras can be analyzed to look for content data to determine whether a particular event of interest takes place. As just one example, the system can use facial recognition to determine which camera the individual is facing at a particular time. The system then can selectively prefer the video input from the camera that the individual is facing at that time in the video. As another example, the system can use gesture recognition to determine that the individual is using their hands when talking. The system can selectively prefer the video input that best captures the hand gestures. For example, if the candidate consistently pivots to the left while gesturing, a right camera profile shot might be subjectively better than minimizing the candidate's energy using the left camera feed. Content data such as facial recognition and gesture recognition can also be used to find events that the system can use to decide when to switch between different camera angles.

In another aspect, the system can choose which video input to use based on a change between segments of the interview, such as between different interview questions.

Turning now to the figures, an example implementation of the disclosed technology will be described in relation to a kiosk for recording video interviews. However, it should be understood that this implementation is only one possible example, and other set ups could be used to implement the disclosed technology.

Figure 1:
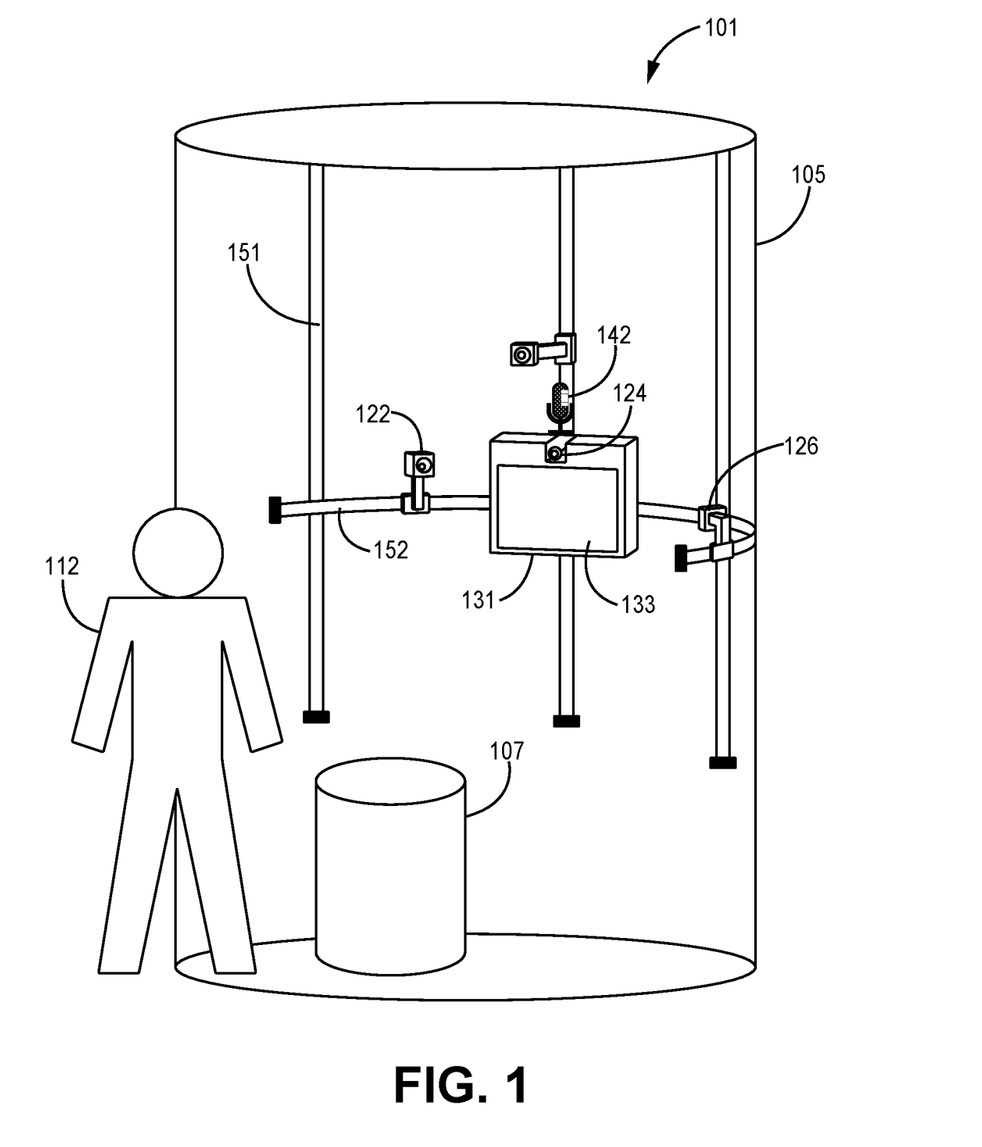
FIG. 1 is a perspective view of a multi-camera kiosk according to some examples.

Video Interview Kiosk (FIG. 1)

FIG. 1 shows a kiosk 101 for recording a video interview of an individual 112. The kiosk 101 is generally shaped as an enclosed booth 105. The individual 112 can be positioned inside of the enclosed booth 105 while being recorded. Optionally, a seat 107 is provided for the individual 112. The kiosk 101 houses multiple cameras, including a first camera 122, a second camera 124, and a third camera 126. Each of the cameras is capable of recording video of the individual 112 from different angles. In the example of FIG. 1, the first camera 122 records the individual 112 from the left side, the second camera 124 records the individual 112 from the center, and the third camera 126 records the individual 112 from the right side. In some examples, the camera 124 can be integrated into a user interface 133 on a tablet computer 131. The user interface 133 can prompt the individual to answer interview questions. A microphone 142 is provided for recording audio.

The first, second, and third cameras 122, 124, 126 can be digital video cameras that record video in the visible spectrum using, for example, a CCD or CMOS image sensor. Optionally, the cameras can be provided with infrared sensors or other sensors to detect depth, movement, etc.

In some examples, the various pieces of hardware can be mounted to the walls of the enclosed booth 105 on a vertical support 151 and a horizontal support 152. The vertical support 151 can be used to adjust the vertical height of the cameras and user interface, and the horizontal support 152 can be used to adjust the angle of the cameras 122, 124, 126.

Figure 2:
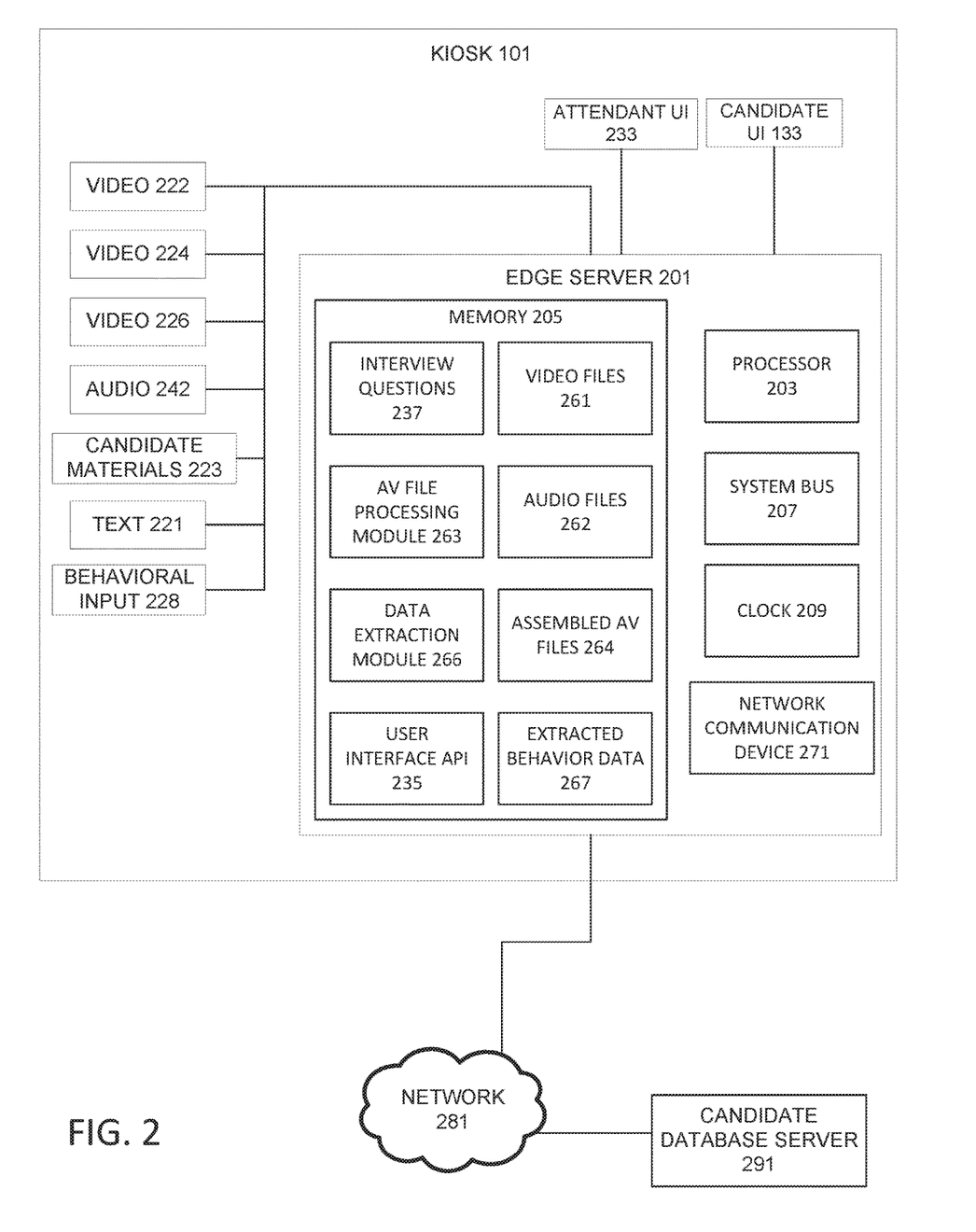
FIG. 2 is a schematic view of a kiosk system according to some examples.

Schematic of Kiosk and Edge Server (FIG. 2)

FIG. 2 shows a schematic diagram of one example of the system. The kiosk 101 includes an edge server 201 that has a computer processor 203, a system bus 207, a system clock 209, and a non-transitory computer memory 205. The edge server 201 is configured to receive input from the video and audio devices of the kiosk and process the received inputs.

The kiosk 101 can further include the candidate user interface 133 in data communication with the edge server 201. An additional user interface 233 can be provided for a kiosk attendant. The attendant user interface 233 can be used, for example, to check in users, or to enter data about the users. The candidate user interface 133 and the attendant user interface 233 can be provided with a user interface application program interface (API) 235 stored in the memory 205 and executed by the processor 203. The user interface API 235 can access particular data stored in the memory 205, such as interview questions 237 that can be displayed to the individual 112 on in the user interface 133. The user interface API 235 can receive input from the individual 112 to prompt a display of a next question once the individual has finished answering a current question.

The system includes multiple types of data inputs. In one example, the camera 122 produces a video input 222, the camera 124 produces a video input 224, and the camera 126 produces a video input 226. The microphone 142 produces an audio input 242. The system also receives behavioral data input 228. The behavioral data input 228 can be from a variety of different sources. In some examples, the behavioral data input 228 is a portion of data received from one or more of the cameras 122, 124, 126. In other words, the system receives video data and uses it as the behavioral data input 228. In some examples, the behavioral data input 228 is a portion of data received from the microphone 142. In some examples, the behavioral data input 228 is sensor data from one or more infrared sensors provided on the cameras 122, 124, 126. The system can also receive text data input 221 that can include text related to the individual 112, and candidate materials 223 that can include materials related to the individual's job candidacy, such as a resume.

In some examples, the video inputs 222, 224, 226 are stored in the memory 205 of the edge server 201 as video files 261. In alternative examples, the video inputs 222, 224, 226 are processed by the processor 203, but are not stored separately. In some examples, the audio input 242 is stored as audio files 262. In alternative examples, the audio input 242 is not stored separately. The candidate materials input 223, text data input 221, and behavioral data input 228 can also be optionally stored or not stored as desired.

In some examples, the edge server 201 further includes a network communication device 271 that enables the edge server 201 to communicate with a remote network 281. This enables data that is received and/or processed at the edge server 201 to be transferred over the network 281 to a candidate database server 291.

The edge server 201 includes computer instructions stored on the memory 205 to perform particular methods. The computer instructions can be stored as software modules. As will be described below, the system can include an audiovisual file processing module 263 for processing received audio and video inputs and assembling the inputs into audiovisual files and storing the assembled audiovisual files 264. The system can include a data extraction module 266 that can receive one or more of the data inputs (video inputs, audio input, behavioral input, etc.) and extract behavior data 267 from the inputs and store the extracted behavior data 267 in the memory 205.

Automatically Creating Audiovisual Files from Two or More Video Inputs (FIGS. 3-7)

The disclosed system and method provide a way to take video inputs from multiple cameras and arrange them automatically into a single audiovisual file that cuts between different camera angles to create a visually interesting product.

Figure 3:
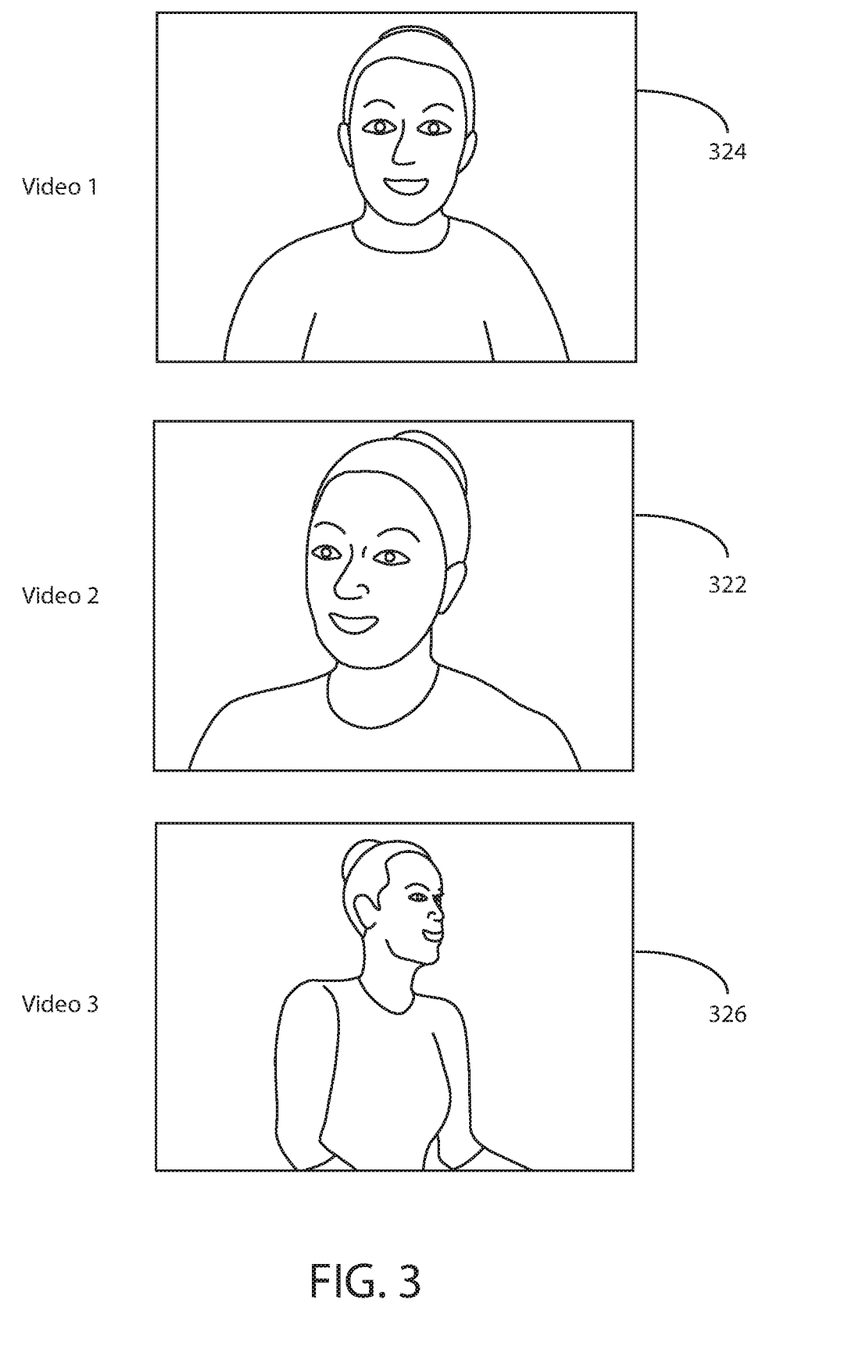
FIG. 3 illustrates an example of multiple video inputs.

FIG. 3 illustrates video frames of video inputs received from different cameras. In this example, video frame 324 is part of the video input 224 that is received from the second camera 124, which focuses on the individual 112 from a front and center angle. This video input is designated as "Video 1" or simply "Vid1." The video frame 322 is part of the video input 222 from the first camera 122, which focuses on the individual 112 from the individual 112's left side. This video input is designated as "Video 2" or simply "Vid2." The video frame 326 is part of the video input 226 from the third camera 126, which focuses on the individual 112 from the individual 112's right side. This video input is designated as "Video 3" or simply "Vid3." These video inputs can be provided using any of a number of different types of video coding formats. These include but are not limited to MPEG-2 Part 2, MPEG-4 Part 2, H.264 (MPEG-4 Part 10), HEVC, and AV1.

Audio inputs 242 can also be provided using any of a number of different types of audio compression formats. These can include but are not limited to MP1, MP2, MP3, AAC, ALAC, and Windows Media Audio.

The system takes audiovisual clips recorded during the video interview and concatenates the audiovisual clips to create a single combined audiovisual file containing video of an individual from multiple camera angles. In some implementations, a system clock 209 creates a timestamp associated with the video inputs 222, 224, 226 and the audio input 242 that allows the system to synchronize the audio and video based on the timestamp. A custom driver can be used to combine the audio input with the video input to create an audiovisual file.

As used herein, an "audiovisual file" is a computer-readable container file that includes both video and audio. An audiovisual file can be saved on a computer memory, transferred to a remote computer via a network, and played back at a later time. Some examples of video encoding formats for an audiovisual file compatible with this disclosure are MP4 (mp4, m4a, mov); 3GP (3gp, 3gp2, 3g2, 3gpp, 3gpp2); WMV (wmv, wma); AVI; and QuickTime.

As used herein, an "audiovisual clip" is a video input combined with an audio input that is synchronized with the video input. For example, the system can record an individual 112 speaking for a particular length of time, such as 30 seconds. In a system that has three cameras, three audiovisual clips could be created from that 30 second recording: a first audiovisual clip can contain the video input 224 from Vid1 synchronized with the audio input 242 from t=0 to t=30 seconds. A second audiovisual clip can contain the video input 222 from Vid2 synchronized with the audio input 242 from t=0 to t=30 seconds. A third audiovisual clip can contain the video input 226 from Vid3 synchronized with the audio input 242 from t=0 to t=30 seconds. Audiovisual clips can be created by processing a video input stream and an audio input stream which are then stored as an audiovisual file. An audiovisual clip as described herein can be, but is not necessarily stored in an intermediate state as a separate audiovisual file before being concatenated with other audiovisual clips. As will be described below, in some examples, the system will select one video input from a number of available video inputs, and use that video input to create an audiovisual clip that will later be saved in an audiovisual file. In some examples, the unused video inputs may be discarded.

Audiovisual clips can be concatenated. As used herein, "concatenated" means adding two audiovisual clips together sequentially in an audiovisual file. For example, two audiovisual clips that are each 30 seconds long can be combined to create a 60-second long audiovisual file. In this case, the audiovisual file would cut from the first audiovisual clip to the second audiovisual clip at the 30 second mark.

During use, each camera in the system records an unbroken sequence of video, and the microphone records an unbroken sequence of audio. An underlying time counter provides a timeline associated with the video and audio so that the video and audio can be synchronized.

In one example of the technology, the system samples the audio track to automatically find events that are used to triggered the system to cut between video inputs when producing an audiovisual file. In one example, the system looks for segments in the audio track in which the volume is below a threshold volume. These will be referred to as low noise audio segments.

Figure 4:
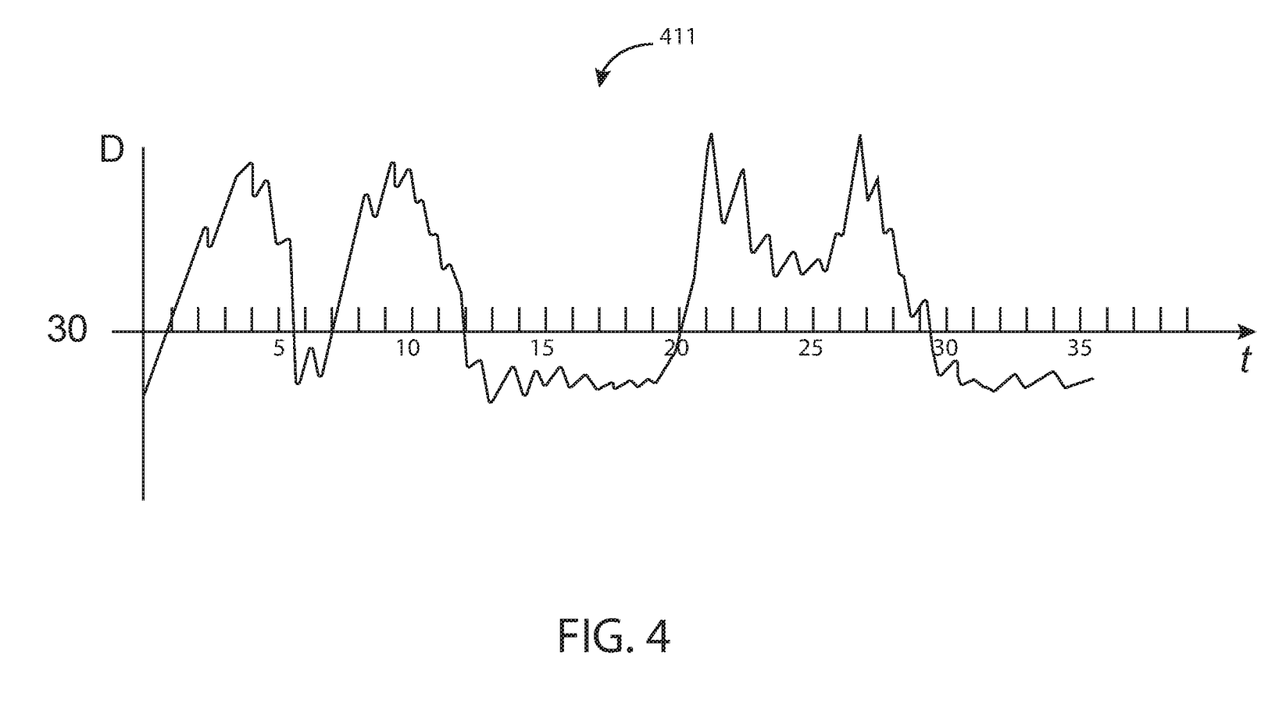
FIG. 4 is a graph of decibel level versus time for an audio input according to some examples.

FIG. 4 is a graph 411 representing the audio volume in an audio track over time. The graph conceptually shows the audio volume of the audio input in decibels (D) versus time in seconds (t). In some examples, the system uses a particular threshold volume as a trigger to determine when to cut between the video inputs. For example, in FIG. 4, the threshold level is 30 decibels. One method of finding low noise audio segments is to calculate an average decibel level over a particular range of time, such as 4 seconds. If the average decibel level during that period of time is below the threshold level, the system will mark this as a low noise audio segment.

Applying this method to FIG. 4, the system computes the average (mean) volume over each four-second interval for the entire length of the audio track, in this case, in the range between t=0 and t=35. Consider an average decibel level over a four second interval between t=5 and t=9. In this case, although the volume falls below 30 decibels for a short period of time, the average volume over that four second period is greater than 30 decibels, and therefore this would not be considered a low noise audio segment. Over the four second interval from t=11 to t=15 seconds, the average volume is less than 30 decibels, and therefore this would be considered a low noise audio segment. In some examples, as soon the system detects an event corresponding to a low noise audio segment, the system marks that time as being a trigger to switch between video inputs.

In some examples, the system marks the beginning and end of the low noise audio segments to find low noise audio segments of a particular length. In this example, the system computes the average (mean) volume over each four second interval, and as soon the average volume is below the threshold volume (in this case 30 decibels), the system marks that interval as corresponding to the beginning of the low noise audio segment. The system continues to sample the audio volume until the average audio volume is above the threshold volume. The system then marks that interval as corresponding to the end of the low noise audio segment.

The system uses the low noise audio segments to determine when to switch between camera angles. After finding and interval corresponding to the beginning or end of the low noise audio segments, the system determines precisely at which time to switch. This can be done in a number of ways, depending upon the desired result.

In the example of FIG. 4, the system could determine that the average volume of the four second interval between =10 and t=12 drops below the threshold volume. The system could use the end of that interval (t=12) to be the time to switch. Alternatively, the system could determine that the average volume of the four-second interval between t=18 and t=22 increases above the threshold volume, and determine that the beginning of that interval (t=18) as the time to switch. The system could also use the midpoint of the beginning and end of the intervals to switch (i.e., midway between t=12 and t=18). Other methods of determining precisely when in the timeline to make the switch are possible, and are within the scope of the technology.

In some examples, the system is configured to discard portions of the video and audio inputs that correspond to a portion of the low noise audio segments. This eliminates dead air and makes the audiovisual file more interesting for the viewer. In some examples, the system only discards audio segments that our at least a predetermined length of time, such as at least 2 seconds, at least 4 seconds, at least 6 seconds, at least 8 seconds, or at least 10 seconds. This implementation will be discussed further in relation to FIG. 6.

Figure 5:
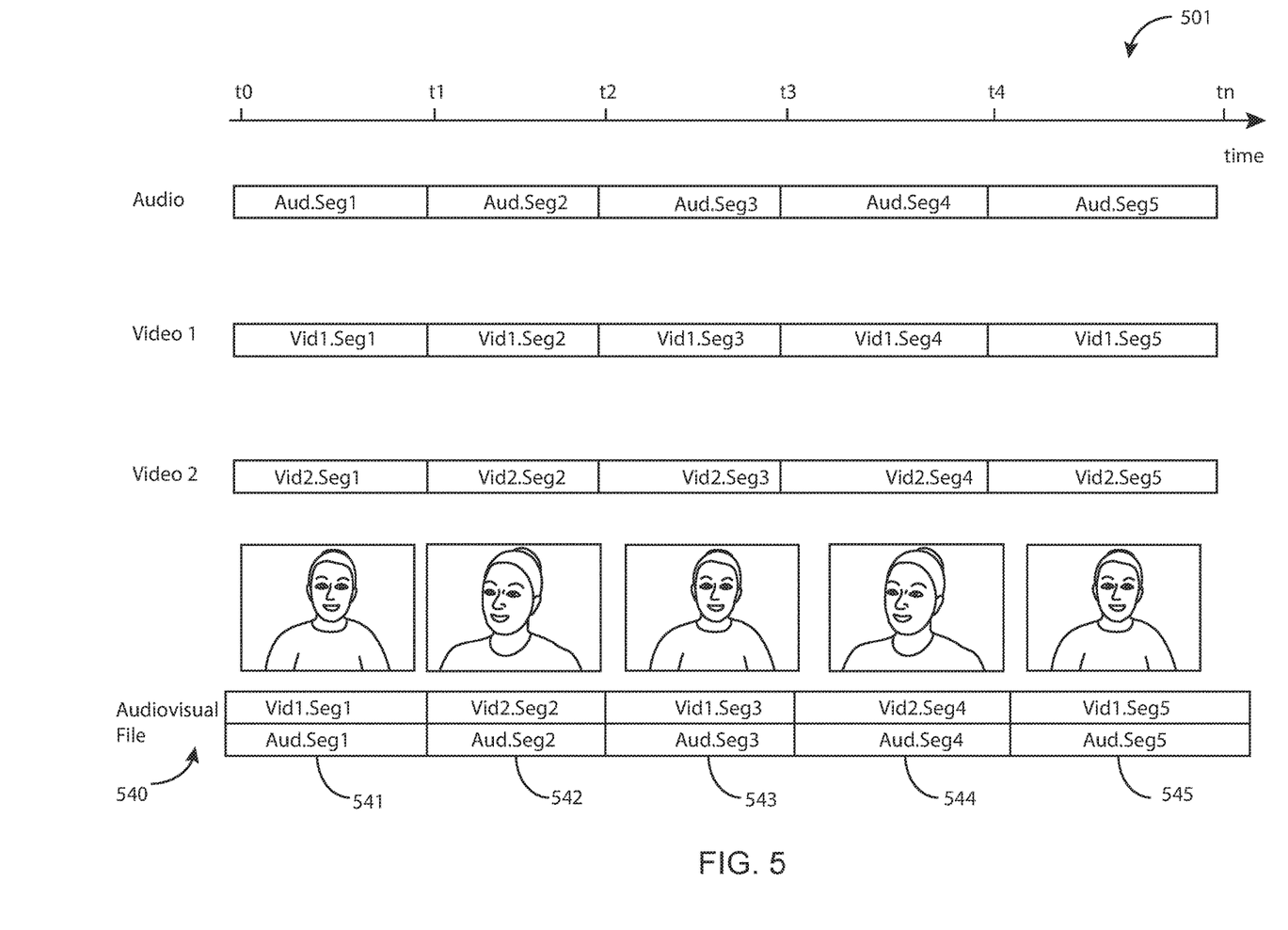
FIG. 5 visually illustrates a method of automatically concatenating audiovisual clips into an audiovisual file according to some examples.

Automatically Concatenating Audiovisual Clips (FIG. 5)

FIG. 5 illustrates a system and method for automatically creating a combined audiovisual file containing video images from two or more video inputs. For the sake of simplicity, only two video inputs are illustrated in FIG. 5. It should be understood, however, that the method and system could be adapted to any number of video inputs.

The system includes two video inputs: Video 1 and Video 2. The system also includes an Audio input. In the example of FIG. 5, the video inputs and the audio input are recorded simultaneously. The two video inputs and the audio input are each recorded as an unbroken sequence. A time counter, such as the system clock 209, provides a timeline 501 that enables a time synchronization of the two video inputs and the audio input. The recording begins at time to and ends at time $t_n$.

In the example of FIG. 5, the system samples the audio track to determine low noise audio segments. For example, the system can use the method as described in relation to FIG. 4; however, other methods of determining low noise audio segments are contemplated, and are within the scope of the disclosed technology.

Sampling the audio track, the system determines that at time $t_1$, a low noise audio event occurred. The time segment between $t=t_0$ and $t=t_1$ is denoted as Seg1. To assemble a combined audiovisual file 540, the system selects an audiovisual clip 541 combining one video input from Seg1 synchronized with the audio from Seg1, and saves this audiovisual clip 541 as a first segment of the audiovisual file 540—in this case, Vid1.Seg1 (Video 1 Segment 1) and Aud.Seg1 (audio Segment 1). In some examples, the system can use a default video input as the initial input, such as using the front-facing camera as the first video input for the first audiovisual clip. In alternative examples, the system may sample content received while the video and audio are being recorded to prefer one video input over another input. For example, the system may use facial or gesture recognition to determine that one camera angle is preferable over another camera angle for that time segment. Various alternatives for choosing which video input to use first are possible, and are within the scope of the technology.

The system continues sampling the audio track, and determines that at time $t_2$, a second low noise audio event occurred. The time segment between $t=t_1$ and $t=t_2$ is denoted as Seg2. For this second time segment, the system automatically switches to the video input from Video 2, and saves a second audiovisual clip 542 containing Vid2.Seg2 and Aud.Seg2. The system concatenates the second audiovisual clip 542 and the first audiovisual clip 541 in the audiovisual file 540.

The system continues sampling the audio track, and determines that at time $t_3$, a third low noise audio event occurred. The time segment between $t=t_2$ and $t=t_3$ is denoted as Seg3. For this third time segment, the system automatically cuts back to the video input from Video 1, and saves a third audiovisual clip 543 containing Vid1.Seg3 and Aud.Seg3. The system concatenates the second audiovisual clip 542 and the third audiovisual clip 543 in the audiovisual file 540.

The system continues sampling the audio track, and determines that at time $t_4$, a fourth low noise audio event occurred. The time segment between $t=t_3$ and $t=t_4$ is denoted as Seg4. For this fourth time segment, the system automatically cuts back to the video input from Video 2, and saves a fourth audiovisual clip 544 containing Vid2.Seg4 and Aud.Seg4. The system concatenates the third audiovisual clip 543 and the fourth audiovisual clip 544 in the audiovisual file 540.

The system continues sampling the audio track, and determines that no additional low noise audio events occur, and the video input and audio input stop recording at time $t_n$. The time segment between $t=t_4$ and $t=t_n$ is denoted as Seg5. For this fifth time segment, the system automatically cuts back to the video input from Video 1, and saves a fifth audiovisual clip 545 containing Vid1.Seg5 and Aud.Seg5. The system concatenates the fourth audiovisual clip 544 and the fifth audiovisual clip 545 in the audiovisual file 540.

In some examples, audio sampling and assembling of the combined audiovisual file is performed in real-time as the video interview is being recorded. In alternative examples, the video input and audio input can be recorded, stored in a memory, and processed later to create a combined audiovisual file. In some examples, after the audiovisual file is created, the raw data from the video inputs and audio input is discarded.

Figure 6:
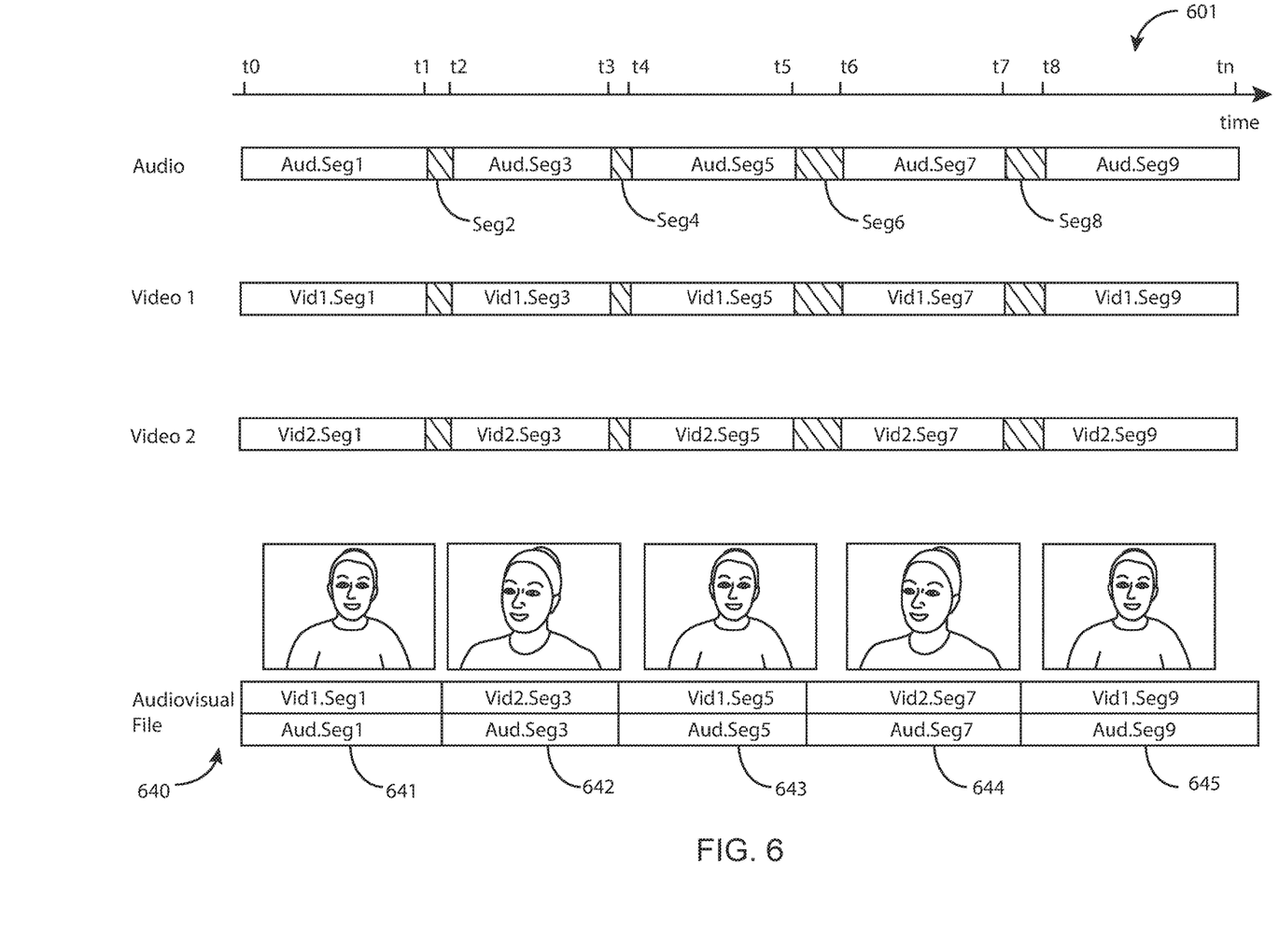
FIG. 6 visually illustrates a method of removing pauses from audio and video inputs and automatically concatenating audiovisual clips into an audiovisual file according to some examples.

Automatically Removing Pauses and Concatenating Audiovisual Clips (FIG. 6)

In another aspect of the technology, the system can be configured to create combined audiovisual files that remove portions of the interview in which the subject is not speaking. FIG. 6 illustrates a system and method for automatically creating a combined audiovisual file containing video images from two or more video input, where a portion of the video input and audio input corresponding to low noise audio segments are not included in the combined audiovisual file. For the sake of simplicity, only two video inputs are illustrated in FIG. 6. It should be understood, however, that the method and system could be adapted to any number of video inputs.

In the example of FIG. 6, the system includes a video input Video 1 and Video number two. The system also includes an Audio input. The video inputs and the audio input are recorded simultaneously in an unbroken sequence. A time counter, such as the system clock 209, provides a timeline 601 that enables a time synchronization of the two video inputs and the audio input. The recording begins at time to and ends at time $t_n$.

As in the example of FIG. 5, the system samples the audio track to determine low noise audio segments. In FIG. 6, the system looks for the beginning and end of low noise audio segments, as described above with relation to FIG. 4. Sampling the audio track, the system determines that at time $t_1$, a low noise audio segment begins, and at time $t_2$, the low noise audio segment ends. The time segment between $t=t_0$ and $t=t_1$ is denoted as Seg1. To assemble a combined audiovisual file 640, the system selects an audiovisual clip 641 combining one video input from Seg1 synchronized with the audio from Seg1, and saves this audiovisual clip 641 as a first segment of the audiovisual file 640—in this case, Vid1.Seg1 (Video 1 Segment 1) and Aud.Seg1 (audio Segment 1). The system then disregards the audio inputs and video inputs that occur during Seg2, the time segment between $t=t_1$ and $t=t_2$.

The system continues sampling the audio track, and determines that at time $t_3$, a second low noise audio segment begins, and at time $t_4$, the second low noise audio segment ends. The time segment between $t=t_2$ and $t=t_3$ is denoted as Seg3. For this time segment, the system automatically switches to the video input from Video 2, and saves a second audiovisual clip 642 containing Vid2.Seg3 and Aud.Seg3. The system concatenates the second audiovisual clip 642 and the first audiovisual clip 641 in the audiovisual file 640.

The system continues sampling the audio input to determine the beginning and end of further low noise audio segments. In the example of FIG. 6, Seg6 is a low noise audio segment beginning at time $t_5$ and ending at time $t_6$. Seg 8 is a low noise audio segment beginning at time $t_7$ and ending at time t8. The system removes the portions of the audio input and video inputs that fall between the beginning and end of the low noise audio segments. At the same time, the system automatically concatenates retained audiovisual clips, switching between the video inputs after the end of each low noise audio segment. The system concatenates the audiovisual clips 643, 644, and 645 to complete the audiovisual file 640. The resulting audiovisual file 640 contains audio from segments 1, 3, 5, 7, and 9. The audiovisual file 640 does not contain audio from segments 2, 4, 6, or 8. The audiovisual file 640 contains alternating video clips from Video 1 and Video 2 that switch between the first video input and the second video input after each low noise audio segment.

Figure 7:
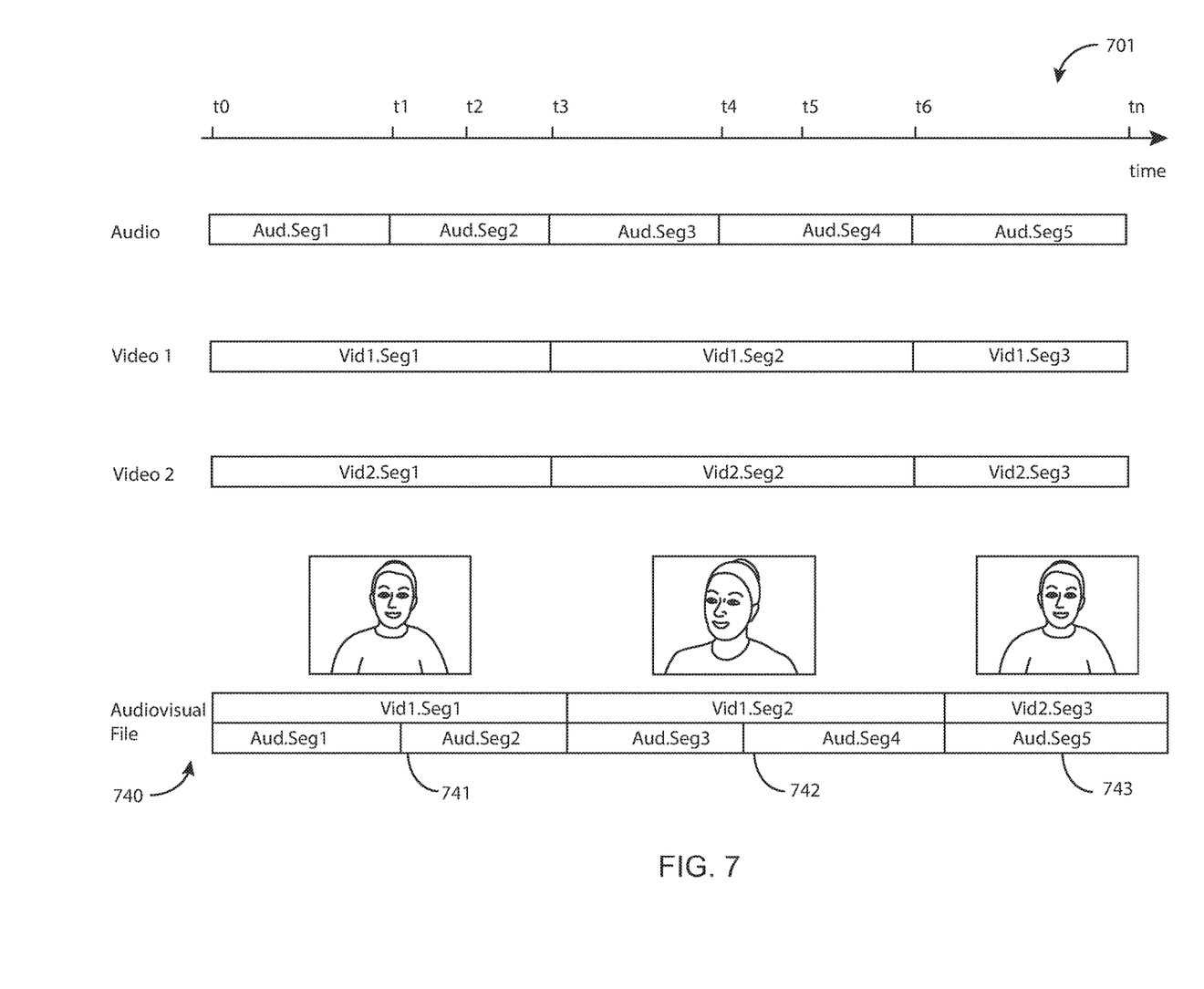
FIG. 7 visually illustrates a method of automatically concatenating audiovisual clips into an audiovisual file in response to an event according to some examples.

Automatically Concatenating Audiovisual Clips with Camera Switching in Response to Switch-Initiating Events (FIG. 7)

In another aspect of the technology, the system can be configured to switch between the different video inputs in response to events other than low noise audio segments. These events will be generally categorized as switch-initiating events. A switch-initiating event can be detected in the content of any of the data inputs that are associated with the timeline. "Content data" refers to any of the data collected during the video interview that can be correlated or associated with a specific time in the timeline. These events are triggers that the system uses to decide when to switch between the different video inputs. For example, behavioral data input, which can be received from an infrared sensor or present in the video or audio, can be associated with the timeline in a similar manner that the audio and video images are associated with the timeline. Facial recognition data, gesture recognition data, and posture recognition data can be monitored to look for switch-initiating events. For example, if the candidate turns away from one of the video cameras to face a different video camera, the system can detect that motion and note it as a switch-initiating event. Hand gestures or changes in posture can also be used to trigger the system to cut from one camera angle to a different camera angle.

As another example, the audio input can be analyzed using speech to text software, and the resulting text can be used to find keywords that trigger a switch. In this example, the words used by the candidate during the interview would be associated with a particular time in the timeline.

Another type of switch-initiating event can be the passage of a particular length of time. A timer can be set for a number of seconds that is the maximum desirable amount of time for a single segment of video. For example, an audiovisual file can feel stagnant and uninteresting if the same camera has been focusing on the subject for more than 90 seconds. The system clock can set a 90 second timer every time that a camera switch occurs. If it is been greater than 90 seconds since the most recent switch-initiating event, expiration of the 90 second timer can be used as the switch-initiating event. Other amounts of time could be used, such as 30 seconds, 45 seconds, 60 seconds, etc., depending on the desired results.

Conversely, the system clock can set a timer corresponding to a minimum number of seconds that must elapse before a switch between two video inputs. For example, the system could detect multiple switch-initiating events in rapid succession, and it may be undesirable to switch back-and-forth between two video inputs too quickly. To prevent this, the system clock could set a timer for 30 seconds, and only register switch-initiating events that occur after expiration of the 30 second timer. Though resulting combined audiovisual file would contain audiovisual clip segments of 30 seconds or longer.

Another type of switch-initiating event is a change between interview questions that the candidate is answering, or between other segments of a video recording session. In the context of an interview, the user interface API 235 (FIG. 2) can display interview questions so that the individual 112 can read each interview question and then respond to it verbally. The user interface API can receive input, such as on a touch screen or input button, to indicate that one question has been answered, and prompt the system to display the next question. The prompt to advance to the next question can be a switch-initiating event.

Turning to FIG. 7, the system includes two video inputs: Video 1 and Video 2. The system also includes an Audio input. In the example of FIG. 7, the video inputs and the audio input are recorded simultaneously. The two video inputs and the audio input are each recorded as an unbroken sequence. A time counter, such as the system clock 209, provides a timeline 701 that enables a time synchronization of the two video inputs and the audio input. The recording begins at time to and ends at time $t_n$. In some examples, the system of FIG. 7 further includes behavioral data input associated with the timeline 701.

In the example of FIG. 7, the system automatically samples the audio input for low noise audio segments in addition to detecting switch-initiating events. The system can sample the audio input using the method as described in relation to FIG. 4; however, other methods of determining low noise audio segments are contemplated, and are within the scope of the disclosed technology.

In FIG. 7, the audio track is sampled in a manner similar to that of FIG. 5. The system determines that at time $t_1$, a low noise audio event occurred. The time segment between $t=t_0$ and $t=t_1$ is denoted as Aud.Seg1. However, no switch-initiating event was detected during Aud.Seg1. Therefore, unlike the system of FIG. 5, the system does not switch video inputs.

At time $t_2$, the system detects a switch-initiating event. However, the system does not switch between camera angles at time $t_2$, because switch-initiating events can occur at any time, including during the middle of a sentence. Instead, the system in FIG. 7 continues sampling the audio input to find the next low noise audio event. This means that a switch between two camera angles is only performed after two conditions have been met: the system detects a switch-initiating event, and then, after the switch-initiating event, the system detects a low noise audio event.

In some examples, instead of continuously sampling the audio track for low noise audio events, the system could wait to detect a switch-initiating event, then begin sampling the audio input immediately after the switch-initiating event. The system would then cut from one video input to the other video input at the next low noise audio segment.

At time $t_3$, the system determines that another low noise audio segment has occurred. Because this low noise audio segment occurred after a switch-initiating event, the system begins assembling a combined audiovisual file 740 by using an audiovisual clip 741 combining one video input (in this case, Video 1) with synchronized audio input for the time segment $t=t_0$ through $t=t_3$.

The system then waits to detect another switch-initiating event. In the example of FIG. 7, the system finds another low noise audio event at $t_4$, but no switch-initiating event has yet occurred. Therefore, the system does not switch to the second video input. At time $t_5$, the system detects a switch-initiating event. The system then looks for the next low noise audio event, which occurs at time $t_6$. Because time $t_6$ is a low noise audio event that follows a switch-initiating event, the system takes the audiovisual clip 742 combining video input from Video 2 and audio input from the time segment from $t=t_3$ to $t=t_6$. The audiovisual clip 741 is concatenated with the audiovisual clip 742 in the audiovisual file 740.

The system then continues to wait for a switch-initiating event. In this case, no switch-initiating event occurs before the end of the video interview at time $t_n$. The audiovisual file 740 is completed by concatenating an alternating audiovisual clip 743 containing video input from Video 1 to the end of the audiovisual file 740.

The various methods described above can be combined in a number of different ways to create entertaining and visually interesting audiovisual interview files. Multiple video cameras can be used to capture a candidate from multiple camera angles. Camera switching between different camera angles can be performed automatically with or without removing audio and video corresponding to long pauses when the candidate is not speaking. Audio, video, and behavioral inputs can be analyzed to look for content data to use as switch-initiating events, and/or to decide which video input to use during a particular segment of the audiovisual file. Some element of biofeedback can be incorporated to favor one video camera input over the others.

As used in this specification and the appended claims, the singular forms include the plural unless the context clearly dictates otherwise. The term "or" is generally employed in the sense of "and/or" unless the content clearly dictates otherwise. The phrase "configured" describes a system, apparatus, or other structure that is constructed or configured to perform a particular task or adopt a particular configuration. The term "configured" can be used interchangeably with other similar terms such as arranged, constructed, manufactured, and the like.

All publications and patent applications referenced in this specification are herein incorporated by reference for all purposes.

While examples of the technology described herein are susceptible to various modifications and alternative forms, specifics thereof have been shown by way of example and drawings. It should be understood, however, that the scope herein is not limited to the particular examples described. On the contrary, the intention is to cover modifications, equivalents, and alternatives falling within the spirit and scope herein.

What is claimed is:

1. A system comprising:
   a first video input and a second video input;
   an audio input;
   a time counter providing a timeline associated with the first video input, the second video input, and the audio input, wherein the timeline enables a time synchronization of the first video input, the second video input, and the audio input;
   a non-transitory computer memory and a computer processor; and
   computer instructions stored on the memory for instructing the processor to perform the steps of:
      sampling the audio input to identify a low noise audio segment in which a decibel level is below a threshold level for a predetermined period of time;
      sampling the audio input to identify a beginning of the low noise audio segment and an end of the low noise audio segment;
      removing portions of the audio input, the first video input, and the second video input that fall between the beginning and the end of the low noise audio segment; and
      automatically assembling a combined audiovisual file by performing the steps of:
         retaining a first audiovisual clip comprising a portion of the audio input and first video input occurring before the low noise audio segment,
         retaining a second audiovisual clip comprising a portion of the audio input and second video input occurring after the low noise audio segment, and
         concatenating the first audiovisual clip and the second audiovisual clip to create a combined audiovisual file that does not contain the low noise audio segment.

2. The system of claim 1, wherein the first video input, the second video input, and the audio input are recorded synchronously, and wherein the combined audiovisual file is a video interview of a job candidate.

3. The system of claim 1, wherein the first audiovisual clip is earlier in the timeline than the second audiovisual clip, and the first audiovisual clip corresponds to a time preceding the second audiovisual clip.

4. The system of claim 1, wherein the predetermined period of time is at least two seconds.

5. The system of claim 1, wherein the low noise audio segment is at least four seconds long.

6. The system of claim 1, further comprising computer instructions stored on the memory for instructing the processor to perform the steps of:
   sampling the audio input to identify multiple low noise audio segments in which the decibel level is below the threshold level for a predetermined period of time; and
   automatically concatenating alternating audiovisual clips that switch between the first video input and second video input after each low noise audio segment.

7. The system of claim 1, further comprising computer instructions stored on the memory for instructing the processor to perform the steps of:
   sampling the audio input to identify multiple low noise audio segments in which the decibel level is below the threshold level for at least the predetermined period of time;

extracting content data from the first video input, the second video input, or the audio input to identify one or more switch-initiating events;
automatically assembling a combined audiovisual file that switches between the first video input and the second video input following a switch-initiating event.

8. The system of claim 7, wherein the switch-initiating events comprise one or more of:
   a. a gesture recognition event;
   b. a facial recognition event;
   c. a length of time of at least 30 seconds since a most recent camera angle switch; or
   d. a keyword extracted from the audio input via speech-to-text.

9. The system of claim 1, wherein the first video input and the second video input each start at the same point in time.

10. The system of claim 9, wherein the first video input and the second video input each end at the same point in time.

11. The system of claim 1, wherein the first video input comes from a first video camera, the second video input comes from a second video camera, and the audio input comes from a first microphone, wherein the first video camera, the second video camera, and the microphone are connected to an edge server, and wherein the time counter comes from the edge server.

12. A computer-implemented method comprising:
receiving first video input of an individual from a first camera,
receiving second video input of the individual from a second camera,
receiving audio input of the individual from a microphone,
wherein the first video input, the second video input, and the audio input are recorded synchronously and the first video input, the second video input, and the audio input are all of a first length;
sampling the audio input, the first video input, or the second video input to identify a low noise audio event, wherein the sampled audio input to identify the low noise audio event has a decibel level that is below a threshold level for a predetermined period of time;
automatically assembling a combined audiovisual file by performing the steps of:
   retaining a first audiovisual clip comprising a portion of the first video input occurring before the low noise audio event and ending at the beginning of the low noise audio event;
   retaining a second audiovisual clip comprising a portion of the second video input occurring after the low noise audio event and beginning at the end of the low noise audio event; and
   concatenating the first audiovisual clip and the second audiovisual clip to create a combined audiovisual file containing video of the individual from two camera angles, wherein the combined audiovisual file does not contain the low noise audio event, wherein the combined audiovisual file is of a second length which is shorter than the first length.

13. The method of claim 12, wherein the combined audiovisual file is a video interview of a job candidate.

14. The method of claim 12, further comprising the steps of:
sampling the audio input to identify a plurality of low noise audio segments;
retaining video clips that alternately switch between the first video input and the second video input following the low noise audio segments; and
concatenating the alternating video clips to create a combined audiovisual file containing video that alternates between two camera angles.

15. The method of claim 14 further comprising the step of extracting content data from the first video input, the second video input, or the audio input to identify one or more switch-initiating events, wherein switching between the first video input and the second video input is only performed for low noise audio segments that follow switch-initiating events.

16. The method of claim 15, wherein the content data is at least one of:
   a. facial recognition;
   b. gesture recognition;
   c. posture recognition; or
   d. keywords extracted using speech-to-text.

17. The method of claim 12 further comprising the steps of:
sampling the audio input to identify multiple extended low noise audio segments that are at least four seconds long;
removing the portions of the audio input, the first video input, and the second video input that fall between the beginning and end of the extended low noise audio segments;
concatenating video clips containing alternating portions of the first video input and portions of the second video input to create a combined audiovisual file that does not contain audio or video occurring between the beginning and end of extended low noise audio segments.

18. A system comprising:
a first video input from a first video camera and a second video input from a second video camera, wherein the first video camera and the second video camera are connected to an edge server, wherein the first video camera and the second video camera each record an event having a first length;
an audio input from a microphone, wherein the microphone is connected to the edge server, wherein the microphone records the event having the first length;
a time counter from the edge server providing a timeline associated with the first video input, the second video input, and the audio input, wherein the timeline enables a time synchronization of the first video input, the second video input, and the audio input;
a non-transitory computer memory and a computer processor; and
computer instructions stored on the memory for instructing the processor to perform the steps of:
   sampling the audio input to identify a low noise audio segment in which a decibel level is below a threshold level for a predetermined period of time; and
   automatically assembling a combined audiovisual file by performing the steps of:
      retaining a first audiovisual clip comprising a portion of the first video input and synchronized audio input occurring before the low noise audio segment and ending at the start of the low noise audio segment;
      retaining a second audiovisual clip comprising a portion of the second video input and synchronized audio input occurring after the low noise audio segment and beginning at the end of the low noise audio segment; and concatenating the first audiovisual clip and the second audiovisual clip to create a combined audiovisual file that does not contain the low noise audio segment, wherein the combined audiovisual file has a second length which is shorter than the first length.

19. The system of claim 18, wherein the first video input, the second video input, and the audio input are recorded synchronously, and wherein the combined audiovisual file is a video interview of a job candidate.

20. The system of claim 18, further comprising computer instructions stored on the memory for instructing the processor to perform the steps of:

sampling the audio input to identify a plurality of low noise audio segments in which the decibel level is below the threshold level for the predetermined period of time; and concatenating a plurality of audiovisual clips that switch between the first video input and the second video input after each low noise audio segment to create a combined audiovisual file containing video that alternates between two camera angles.

\* \* \* \* \*